United States Patent Office 2,887,514
Patented May 19, 1959

2,887,514

PREPARATION OF ALKYLAMINO AROMATIC COMPOUNDS

Louis Schmerling, Riverside, Ill., assignor to Universal Oil Products Company, Des Plaines, Ill., a corporation of Delaware No Drawing. Application June 17, 1957
Serial No. 666,236

9 Claims. (Cl. 260—577)

This invention relates to a process for preparing alkylamino aromatic compounds, and particularly to a novel process for introducing alkylamino groups into an aromatic compound. More particularly the invention relates to a process for preparing N,N-dialkylamino aromatic compounds.

Heretofore alkylamino groups have been introduced into aromatic compounds by treating the particular aromatic compound with a gaseous monoalkyl- or dialkylamine. However, this process has many drawbacks and disadvantages, particularly when using lower molecular weight amines, inasmuch as the problem of working with a gaseous reactant involves the use of relatively high pressures and equipment which is relatively more complicated and costly than that which may be used when working with liquid reactants. It has now been discovered that alkylamino substituents may be introduced into an aromatic compound by reacting an aromatic compound, and particularly a haloaromatic compound, with an alkylformamide.

It is therefore an object of this invention to provide a novel process for preparing alkylamino aromatic compounds.

A further object of this invention is to provide a novel process for introducing alkylamino substituents into an aromatic compound by treating a particular aromatic compound with an alkylformamide.

One embodiment of this invention resides in a process for the preparation of an alkylamino aromatic compound by reacting a haloaromatic compound with an alkylformamide at an elevated temperature and pressure, and recovering the resultant alkylamino aromatic compound.

A further embodiment of this invention is found in a process for the preparation of an alkylamino aromatic compound which comprises reacting an alkylformamide with chlorobenzene at a temperature in the range of from about 100° to about 300° C. and at a pressure in the range of from about 1 to about 100 atmospheres, and recovering the resultant alkylaminobenzene.

Another embodiment of the invention is found in a process for the preparation of an N,N-dimethylamino aromatic compound which comprises reacting an N,N-dimethylformamide with a haloaromatic compound at a temperature in the range of from about 100° to about 300° C. and at a pressure in the range of from about 1 to about 100 atmospheres, and recovering the resultant N,N-dimethylamino aromatic compound.

A specific embodiment of the invention resides in a process for the preparation of N,N-dimethyl-p-nitroaniline which comprises reacting N,N-dimethylformamide with p-nitrochlorobenzene at a temperature in the range of from about 190° to about 225° C. and at a pressure in the range of from about 25 to about 75 atmospheres, and recovering the resultant N,N-dimethyl-p-nitroaniline.

Other objects and embodiments referring to alternative alkylformamides and to alternative aromatic compounds will be found in the following further detailed description of the invention.

As hereinbefore set forth it has now been discovered that alkylamino aromatic compounds can be prepared by reacting an alkylformamide with an aromatic compound to prepare alkylamino aromatic compounds. The terms "alkylformamides" and "alkylamino aromatic compounds" when used in this invention will connote both mono- and dialkylformamides and mono- and dialkylamino aromatic compounds respectively. The alkylamino aromatic compounds prepared by the process of this invention find use in the chemical industry as intermediates in the preparation of inhibitors which are utilized in the stabilization of various organic materials which are unstable in storage, during treatment and/or in use, and include motor fuel, jet fuel, diesel oil, mineral oil, lubricating oil, fuel oil, drying oil, greases, waxes, rubber, edible fats and oils, forage crops, monomers such as styrene, butadiene, isoprene, acetylene, etc., various unsaturated alcohols, acids, ketones, etc. These materials are adversely affected by oxygen with the resultant formation of undesirable gums, discoloration, rancidity and/or other deleterious reaction products.

In addition, the inhibitors formed from the intermediates of the present invention are applicable to the stabilization of edible and inedible fats and oils, which may be of animal, vegetable or mineral origin and which tend to become rancid especially during long periods of storage prior to use. Typical representatives of the edible fats and oils include linseed oil, cod liver oil, castor oil, olive oil, rapeseed oil, coconut oil, palm oil, corn oil, sesame oil, peanut oil, babassu oil, butter, fat, lard, beef tallow, etc. Also, the inhibitors are particularly applicable to the stabilization of motor fuels, and still more particularly to unsaturated gasolines including cracked gasoline, polymer gasoline, etc. which, as hereinbefore set forth, tend to form undesirable gums and/or undergo discoloration when in storage, under treatment or in transportation. For example, N-sec-butylformamide, when reacted with p-nitrochlorobenzene, will form N-sec-butyl-p-nitroaniline which is an intermediate in the preparation of N,N'-di-sec-butyl-p-phenylenediamine, an effective, proven oxidation inhibitor for organic compounds susceptible to oxidative deterioration.

Alkyl formamides which may be used in this invention include monoalkylformamides such as N-methylformamide, N-ethylformamide, N-propylformamide, N-isopropylformamide, N-n-butylformamide, N-sec-butylformamide, N-tert-butylformamide, N-n-pentylformamide, N-sec-pentylformamides, N-tert-pentylformamide, N-n-hexylformamide, N-sec-hexylformamides, N-tert-hexylformamides, N-n-heptylformamide, N-sec-heptylformamides, N-tert-heptylformamides, N-n-octylformamides, N-sec-octylformamides, N-tert-octylformamides, N-n-nonylformamide, N-sec-nonylformamides, N-tert-nonylformamides, N-n-decylformamide, N-sec-decylformamides, N-tert-decylformamides, etc.; and dialkylformamides such as N,N-dimethylformamide, N,N-diethylformamide, N,N-dipropylformamide, N,N-diisopropylformamide, N,N-di-n-butylformamide, N,N-di-sec-butylformamide, N,N-di-tert-butylformamide, N,N,-di-n-pentylformamide, N,N-di-sec-pentylformamides, N,N-di-tert-pentylformamide, N,N,-di-n-hexylformamide, N,N-di-sec-hexylformamides, N,N-di-tert-hexylformamides, N,N-di-n-heptylformamide, N,N-di-sec-heptylformamides, N,N-di-tert-heptylformamides, N,N,-di-n-octylformamide, N,N-di-sec-octylformamide, N,N-di-tert-octylformamide, N,N-di-n-nonylformamide, N,N-di-sec-nonylformamides, N,N-di-tert-nonylformamides, N,N-di-n-decylformamide, N,N-di-sec-decylformamides, N,N-di-tert-decylformamides, etc. It is also contemplated within the scope of this invention that mixed dialkylformamides may be used, such compounds including N-methyl-N-ethylformamide, N-methyl-N-propylformamide, N-methyl-N-isopropylformamide, N- methyl-N-n-butylformamide, N-methyl-N-sec-butylformamide, N-ethyl-N-propylformamide, N-ethyl-N-isopropylformamide, N-ethyl-N-n-butylformamide, N-ethyl-N-sec-butylformamide, N-ethyl-N-tert-butylformamide, N-propyl-N-butylformamides, etc.

Aromatic compounds which may be reacted with the aforementioned alkylformamides to form the desired reaction products of this invention include haloaromatic compounds in which the halogen substituent has an atomic weight of between 35 and 80 (i.e. chlorine or bromine), such as chlorobenzene, bromobenzene, o-chlorotoluene, m-chlorotoluene, p-chlorotoluene, m-bromotoluene, o-bromotoluene, p-bromotoluene, o-chloroethylbenzene, m-chloroethylbenzene, p-chloroethylbenzene, o-bromoethylbenzene, m-bromoethylbenzene, p-bromoethylbenzene, 3-chloro-o-xylene, 4-chloro-o-xylene, 5-chloro-o-xylene, 3-bromo-o-xylene, 4-bromo-o-xylene, 5-bromo-o-xylene, 4-chloro-m-xylene, 5-chloro-m-xylene, 4-bromo-m-xylene, 5-bromo-m-xylene, 2-chloro-p-xylene, 3-chloro-p-xylene, 2-bromo-p-xylene, 3-bromo-p-xylene, o-chlorophenol, m-chlorophenol, p-chlorophenol, o-bromophenol, m-bromophenol, p-bromophenol, 3-chlorocatechol, 4-chlorocatechol, 5-chlorocatechol, 3-bromocatechol, 4-bromocatechol, 5-bromocatechol, 4-chlororesorcinol, 5-chlororesorcinol, 4-bromoresorcinol, 5-bromoresorcinol, 2-chlorohydroquinone, 3-chlorohydroquinone, 2-bromohydroquinone, 3-bromohydroquinone, o-chloronitrobenzene, m-chloronitrobenzene, p-chloronitrobenzene, o-bromonitrobenzene, m-bromonitrobenzene, p - bromonitrobenzene, 1 - chloro - 2 - alkyl - 4 - nitrobenzenes, 1 - chloro - 3 - alkyl - 4 - nitrobenzenes, etc.; polynuclear aromatic compounds such as chloronaphthalene, bromonaphthalene, 1-chlorochrysene, 1-bromochrysene, 1-chloroanthracene, 1-bromoanthracene, 2-chloroanthracene, 2-bromoanthracene, 1-chloropyrene, 1-bromopyrene, etc. In addition alkyl- and nitro substituted halopolynuclear aromatic compounds such as 1 - chloro - 2 - methylnaphthalene, 1 - chloro - 2 - nitronaphthalene, 1-chloro-2-methylchrysene, 1-bromo-2-nitrochrysene, etc., may also be used. It is to be understood that the aforementioned haloaromatic compounds and alkylformamides are only representatives of the class of compounds which may be used, and that the present invention is not necessarily limited thereto.

In addition, it is also contemplated within the scope of this invention that alkylformamides may also be reacted with haloaliphatic compounds to form alkylamino aliphatic compounds, although not necessarily with equivalent results. Examples of haloaliphatic compounds which may be used include chloroethane, bromoethane, 1,2-dichloroethane, 1,2-dibromoethane, 1-chloropropane, 1-bromopropane, 1,3-dichloropropane, 1,3-dibromopropane, 1-chlorobutane, 1-bromobutane, 1,4-dichlorobutane, 1,4-dibromobutane, etc.

The process of this invention is effected at elevated temperatures and pressures. Temperatures in the range of from about 100° to about 300° C. or more, and preferably in a range of from about 175° to about 225° C. are used. In addition the reaction will take place at pressures ranging from about 1 to about 100 atmospheres or more and usually preferably at a pressure sufficient to maintain a substantial proportion of the reactants in the liquid phase.

The process of this invention may be effected in any suitable manner and may comprise either a batch or a continuous type operation. For example, when a batch type operation is used a mixture of the haloaromatic compound and the alkylformamide is placed in an appropriate condensation apparatus after which the apparatus is heated to the desired temperature. Pressure may be supplied by means of an inert gas, the apparatus and contents thereof being maintained at the desired temperature and pressure for a predetermined period of time. At the end of this time the flask and contents thereof are allowed to cool to room temperature, the excess pressure is vented and the reaction product is washed with water, filtered and extracted with an organic solvent, if necessary, and then subjected to distillation or any other purification means known in the art, thereby obtaining the aforesaid desired reaction product in a relatively pure state.

The condensation of the haloaromatic compound and the alkylformamide may also be effected in a continuous type operation. In one such operation the starting reactants are continuously charged to a reaction zone which is maintained at suitable operating conditions of temperature and pressure. The reaction zone may comprise an unpacked vessel or coil or may be lined with an adsorbent packing material such as fire brick, dehydrated bauxite, alumina and the like. If so desired the starting materials may be continuously charged to said zone through separate lines, or may be admixed prior to entry into said zone and charged thereto in a single line. The reaction product is continuously withdrawn from the reaction zone, separated from the unreacted starting materials, and purified by conventional means hereinbefore set forth, while the latter are recycled for use as a portion of the feed stock.

The following examples are given to illustrate the process of the present invention, which, however, are not intended to limit the generally broad scope of the present invention in strict accordance therewith.

Example I

A mixture of 30 g. of p-nitrochlorobenzene and 60 g. of N,N-dimethylformamide were placed in a glass liner of a rotating autoclave having an 850 cc. capacity. The liner was sealed into the autoclave, 30 atmospheres of nitrogen was pressed in, and the autoclave was heated to a temperature of about 200° C. The autoclave and contents thereof were maintained at this temperature for about 5 hours, the maximum pressure during this period rising to 72 atmospheres. At the end of the aforementioned 5 hours the autoclave and contents thereof were cooled to room temperature, the final pressure at room temperature being 41 atmospheres, the excess pressure being due largely to carbon monoxide evolved during the reaction. The excess pressure was vented and the reaction product consisting of 77 g. of a dark brown crystalline material and a dark liquid was treated with water and filtered, yielding 32 g. of dark brown, needle-like crystalline material which had a melting point of 158° C. The product was extracted with benzene in a Soxhlet extractor yielding 25 g. of a yellow, needle-like crystalline material which melted at 157–158° C., said compound being N,N-dimethyl-p-nitroaniline.

Example II

A mixture of 50 g. of N-sec-butylformamide and 25 g. of p-nitrochlorobenzene are placed in the glass liner of a rotating autoclave. The liner is sealed into said autoclave and heated to a temperature of about 200° C. The autoclave and contents thereof are maintained at this temperature for about 5 hours after which said autoclave is allowed to cool to room temperature. The excess pressure is vented and the reaction product is washed with water, filtered, extracted with benzene to yield N-sec-butyl-p-nitroaniline.

Example III

A mixture of 50 g. of N,N-diethylformamide and 25 g. of p-chlorotoluene is treated in a manner similar to that set forth in Example I above.

I claim as my invention:

1. A process which comprises reacting alkylformamide with a haloaromatic compound selected from the group consisting of haloaromatic hydrocarbons, halohydroxyaromatic hydrocarbons and halonitroaromatic hydrocarbons in which the halogen is selected from the group consisting of chlorine and bromine at a temperature in the range of from about 100° to about 300° C. and at a pressure in the range of from about 1 to about 100 atmospheres.

2. A process which comprises reacting an alkylformamide with chlorobenzene at a temperature in the range of from about 100° to about 300° C. and at a pressure in the range of from about 1 to about 100 atmospheres, and recovering the resultant alkylaniline.

3. A process which comprises reacting an alkylformamide with p-chlorotoluene at a temperature in the range of from about 100° to about 300° C. and at a pressure in the range of from about 1 to about 100 atmospheres, and recovering the resultant alkylamino toluene.

4. A process which comprises reacting an alkylformamide with p-bromotoluene at a temperature in the range of from about 100° to about 300° C. and at a pressure in the range of from about 1 to about 100 atmospheres, and recovering the resultant alkylaminotoluene.

5. A process which comprises reacting an alkylformamide with p-nitrochlorobenzene at a temperature in the range of from about 100° to about 300° C. and at a pressure in the range of from about 1 to about 100 atmospheres, and recovering the resultant alkylaminonitrobenzene.

6. A process which comprises reacting an alkylformamide with chloronaphthalene at a temperature in the range of from about 100° to about 300° C. and at a pressure in the range of from about 1 to about 100 atmospheres, and recovering the resultant alkylaminonaphthalene.

7. A process which comprises reacting N,N-dialkylformamide with a haloaromatic compound selected from the group consisting of haloaromatic hydrocarbons, halohydroxyaromatic hydrocarbons and halonitroaromatic hydrocarbons in which the halogen is selected from the group consisting of chlorine and bromine at a temperature in the range of from about 100° to about 300° C. and at a pressure in the range of from about 1 to about 100 atmospheres.

8. A process for the preparation of N,N-dimethyl-p-nitroaniline which comprises reacting N,N-dimethylformamide with p-nitrochlorobenzene at a temperature in the range of from about 175° to about 225° C. and at a pressure in the range of from about 5 to about 75 atmospheres, and recovering the resultant N,N-dimethyl-p-nitroaniline.

9. A process for the preparation of N-sec-butyl-p-nitroaniline which comprises reacting N-sec-butylformamide with p-nitrochlorobenzene at a temperature in the range of from about 175° to about 225° C. and at a pressure in the range of from about 5 to about 75 atmospheres, and recovering the resultant N-sec-butyl-p-nitroaniline.

References Cited in the file of this patent

UNITED STATES PATENTS

| | | |
|---|---|---|
| 2,603,661 | Bruce et al. | July 15, 1952 |
| 2,619,446 | Andersen | Nov. 25, 1952 |

FOREIGN PATENTS

| | | |
|---|---|---|
| 976,959 | France | Nov. 8, 1950 |